(12) United States Patent
Numaguchi et al.

(10) Patent No.: US 6,261,991 B1
(45) Date of Patent: Jul. 17, 2001

(54) STEAM-REFORMING CATALYST FOR HYDROCARBONS

(75) Inventors: Toru Numaguchi; Yasuhiro Izawa, both of Chiba (JP)

(73) Assignee: Toyo Engineering Corporation, Tokyo (JP)

( * ) Notice: Subject to any disclaimer, the term of this patent is extended or adjusted under 35 U.S.C. 154(b) by 0 days.

(21) Appl. No.: 09/382,151

(22) Filed: Aug. 24, 1999

(30) Foreign Application Priority Data

Mar. 25, 1999 (JP) .................................................. 11-081669

(51) Int. Cl.$^7$ .............................. B01J 23/00; B01J 21/18; B01J 23/40; B01J 23/74; B01J 23/42

(52) U.S. Cl. ........................ 502/337; 502/185; 502/327; 502/335; 208/137

(58) Field of Search .................................... 502/185, 325, 502/326, 327, 332, 335, 337; 208/137

(56) References Cited

U.S. PATENT DOCUMENTS

| | | | |
|---|---|---|---|
| 4,101,449 | * | 7/1978 | Noda et al. ........................... 252/457 |
| 4,215,998 | * | 8/1980 | Futami ................................ 48/214 A |
| 4,285,837 | * | 8/1981 | Sato et al. ........................... 252/466 J |
| 4,454,207 | * | 6/1984 | Fraioli et al. ........................... 429/17 |
| 4,988,661 | * | 1/1991 | Arai et al. ............................. 502/327 |
| 4,990,481 | | 2/1991 | Sato et al. . |
| 5,100,857 | | 3/1992 | Sato et al. . |
| 5,143,647 | * | 9/1992 | Say et al. .............................. 252/373 |
| 5,773,589 | | 6/1998 | Shoji et al. . |
| 5,939,353 | * | 8/1999 | Bhattacharyya et al. ............ 502/524 |

FOREIGN PATENT DOCUMENTS

| | | | |
|---|---|---|---|
| 0465061A2 | * | 1/1992 | (EP) . |
| 6-16850 | | 3/1994 | (JP) . |
| 6-83787 | | 10/1994 | (JP) . |
| 9-299798 | | 11/1997 | (JP) . |

* cited by examiner

Primary Examiner—Steven P. Griffin
Assistant Examiner—Cam N. Nguyen
(74) Attorney, Agent, or Firm—Flynn, Thiel, Boutell & Tanis, P.C.

(57) ABSTRACT

A catalyst for reforming of hydrocarbons with less reduction in activity. An improved steam-reforming catalyst for hydrocarbons, wherein the active component Ni is supported on an $\alpha$-$Al_2O_3$ or CaO—$Al_2O_3$ carrier, a part of the active component Ni is combined with the carrier to form a compound $NiAl_2O_4$, and carbon is contained in both of the Ni and $NiAl_2O_4$ components, and the grating constant of Ni and the grating constant of $NiAl_2O_4$ in the catalyst are increased as compared with those of the catalyst before carbon is added to in both of the said components.

12 Claims, No Drawings

STEAM-REFORMING CATALYST FOR HYDROCARBONS

DETAILED DESCRIPTION OF THE INVENTION

1. Field of the Invention

The present invention relates to an improved steam-reforming catalyst for hydrocarbons having a smaller reduction in catalyst activity.

2. Prior Art

Generally, the high activity of a catalyst is realized by finely dispersing an active component and enlarging the surface area of the active component. As is well-known, the method of finely dispersing metal particles is realized by e.g. an oxidoreduction treatment or a deposition/precipitation carrying method after the metal particles are carried by impregnation, deposition, co-precipitation, kneading, ion-exchange etc. However, even if the active component is micronized for application to a steam-reforming catalyst for hydrocarbons, the sintering of the active component is significant because the catalyst is used at high temperature. As particles of the active component become finer, sintering proceeds more rapidly, causing a rapid reduction in activity.

On one hand, it is effective to raise the effective diffusion coefficient of a catalyst by devising its pore structure in order to perform a steam-reforming reaction for hydrocarbons with a high activity of the catalyst. This is because in said reaction, the diffusion resistance upon diffusion of a reaction material and product through pores is high.

In JP Patent No. 1,894,792 and JP-B 6-83787, the present inventors proposed that the high activity of a catalyst is realized by devising the pore structure of the catalyst to raise the effective diffusion coefficient. Further, in JP-A 9-299798, they disclosed a proposal that both the mechanical strength and high activity of a catalyst are allowed to remain.

In these studies, the present inventors also examined the micronization of an active component. Generally, the high activity of a catalyst can also be realized by finely dispersing an active component and enlarging the surface area of the active component, and this also applies to the steam-reforming reaction for hydrocarbons. That is, the increase of the effective diffusion coefficient and the micronization of the active component contribute synergistically to a higher activation, but as described above, there is the problem of significant sintering of the active component in said reaction.

The highly active catalyst proposed by the present inventors could be practically used because the reduction of its activity was lower than that of conventional commercial catalysts. However, although said catalyst was practical, the reaction temperature should be increased for a short time in a reactor in order to maintain the same rate of reaction. The energy therefor is increased as the activity of the catalyst is lowered. Accordingly, from the view point of saving energy, there remains the problem of preventing the activity of the catalyst for a long time from being lowered.

PROBLEM TO BE SOLVED BY THE INVENTION

The object of the present invention is to provide an improved steam-reforming catalyst for hydrocarbons having a smaller reduction in catalyst activity.

MEANS FOR SOLVING THE PROBLEM

To lessen the reduction of the activity of a steam-reforming catalyst for hydrocarbons, the present inventors, by repeated trial and error, made extensive studies. As a result, they found that the catalyst described below hardly undergoes any activity reduction.

That is, (1) the catalyst wherein the carrier is $\alpha$-$Al_2O_3$ or CaO—$Al_2O_3$, Ni, as the active component carried by said carrier, forms, together with the carrier, a compound composed of Ni and $\alpha$-$Al_2O_3$ (abbreviated hereinafter to $NiAl_2O_4$) and is carried as Ni and $NiAl_2O_4$, carbon is contained in both Ni and $NiAl_2O_4$, and the grating constant of Ni and the grating constant of $NiAl_2O_4$ in said catalyst are increased as compared with those of the catalyst before carbon is added, (2) the catalyst wherein the carrier is $\alpha$-$Al_2O_3$ or CaO—$Al_2O_3$, carbon is contained in Ni as the active component carried by said carrier, and the grating constant of Ni in said catalyst is increased as compared with that of the catalyst before carbon is added, and (3) the catalyst in items (1) and (2) above wherein Ni as the active component is contained as Ni in an amount of 3 to 20 wt-%.

The present invention was made on the basis of the above-described circumstances and the above-described findings, and the object of the present invention can be achieved by the following means.

That is, the present invention provides:

(1) An improved steam-reforming catalyst for hydrocarbons, wherein the active component Ni is supported on an $\alpha$-$Al_2O_3$ carrier, a part of said active component Ni is combined with said carrier to form a compound $NiAl_2O_4$, carbon is contained in both of said Ni and $NiAl_2O_4$ components, and the grating constant of Ni and the grating constant of $NiAl_2O_4$ in said catalyst are increased as compared with those of the catalyst before carbon is added to both of said components;

(2) An improved steam-reforming catalyst for hydrocarbons, wherein the active component Ni is carried by a CaO—$Al_2O_3$ carrier, a part of said active component Ni is combined with said carrier to form a compound $NiAl_2O_4$, carbon is contained in both of said Ni and $NiAl_2O_4$ components, and the grating constant of Ni and the grating constant of $NiAl_2O_4$ in said catalyst are increased as compared with those of the catalyst before carbon is added to both of said components; and (3) The improved steam-reforming catalyst for hydrocarbons according to item (1) or (2) above, wherein the increase of the grating constant of Ni is 0.0001 to 0.0008 nm, and the increase of the grating constant of $NiAl_2O_4$ is 0.001 to 0.005 nm.

Further, the present invention provides:

(4) An improved steam-reforming catalyst for hydrocarbons, wherein the active component Ni is supported on an $\alpha$-$Al_2O_3$ carrier, carbon is contained in said active component Ni, and the grating constant of Ni in said catalyst is increased as compared with that of the catalyst before carbon is added to said active component Ni;

(5) An improved steam-reforming catalyst for hydrocarbons, wherein the active component Ni is supported on a CaO—$Al_2O_3$ carrier, carbon is contained in said active component Ni, and the grating constant of Ni in said catalyst is increased as compared with that of the catalyst before carbon is added to said active component Ni;

(6) The improved steam-reforming catalyst for hydrocarbons according to item (4) or (5) above, wherein the increase of the grating constant of Ni is 0.0001 to 0.0008 nm; and (7) The improved steam-reforming catalyst for hydrocarbons according to any one of items (1) to (6) above, wherein the active component is contained as Ni in an amount of 3 to 20 wt-%.

DETAILED DESCRIPTION OF THE INVENTION

In the present invention, suitable hydrocarbons to be reformed with steam are $C_1$ methane to $C_8$ hydrocarbons and their compounds.

The carrier will be described. In the present invention, typical components of the carrier include, but are not limited to, $\alpha$-$Al_2O_3$ and CaO—$Al_2O_3$. The carrier has distributed pores, and there is no limit to the shape of pore distribution therein. For example, the carriers disclosed by the applicant in JP Patent No. 1894792, JP-B 6-83787, JP-A 9-299798 etc. can naturally be included in the present invention.

Hereinafter, the active component of the catalyst is described. The active component as the subject of the present invention is Ni.

As the active component, Ni is contained in a content of 3 to 20 wt-% in the catalyst. When the content thereof is less than 3 wt-%, the activity of the catalyst may be low. When the content thereof exceeds 20 wt-%, the catalyst has sufficient sintering resistance, but the activity of the catalyst may not be increased adequately, and thus the Ni content of 3 to 20 wt-% in the catalyst suffices as the concentration of the active component.

There is no adverse effect on the activity or activity reduction of the catalyst of the present invention, even if alkali metals such as K, alkaline earth metals such as Ba, Mg and Sr, Group IIIA elements of the Periodic Table such as Ga, In, La and other elements such as Ti and Zr are contained as impurities or additives in the catalyst,.

Hereinafter, the method of finely dispersing and carrying the active component of the catalyst on the a-$Al_2O_3$ carrier and CaO—$Al_2O_3$ carrier is described. First, the method of finely dispersing and carrying the active component of the catalyst finely on the $\alpha$-$Al_2O_3$ carrier is described. Said active component Ni can be carried by impregnation, deposition, co-precipitation, kneading and ion-exchange, though impregnation may be usually selected. Ni is supported on the $\alpha$-$Al_2O_3$ carrier by impregnation in an ordinary way, then dried at about 120° C. and further calcined at a temperature of 300 to 400° C. or higher to decompose nitrates. The resulting catalyst corresponds to the catalyst N shown in Comparative Example 2 below. This catalyst is mentioned, in claims 4 and 6 in the present application, as the catalyst before carbon is added to the active component. The catalyst thus treated is thermally treated at about 900° C. in air, thereby forming $NiAl_2O_4$ as a compound of the active component and the carrier component, and it is known that subsequent reduction at about 750° C. yields a catalyst having Ni as the active component in the presence of $NiAl_2O_4$. This catalyst falls under the catalyst NNA shown in Comparative Example 1 below. This catalyst is mentioned, in claims 1 and 3 in the present application, as the catalyst before carbon is added to the active component.

However, if such catalysts with the carbon-free active component are used, their activity is lowered more or less as shown in Comparative Examples 1 and 2, respectively.

Now, the method of finely dispersing and carrying the active component of the catalyst on the CaO—$Al_2O_3$ carrier is described. Here, the CaO—$Al_2O_3$ carrier refers to a carrier constituted of CaO and $Al_2O_3$, in which at least part of the CaO forms compounds with $Al_2O_3$. One of the typical compounds is an aluminate of CaO and $Al_2O_3$. It is preferable that at least 50 % of the CaO forms the aluminate with $Al_2O_3$. The aluminate compound can be obtained, for example, by an ordinary method in which the so-called calcium-alumina cement, consisting of $\alpha$-$Al_2O_3$ and CaO—$Al_2O_3$, aluminum hydroxide, etc. are formed and then calcined at 1300° C. or higher. Alternatively, $\gamma$—$Al_2O_3$ may be used in place of $\alpha$-$Al_2O_3$.

The content of CaO in the catalyst is 0.5 to 25 wt-%, preferably 2 to 20 wt-%. If the content thereof is lower than 0.5 wt-%, the crushing strength is low. Even if the content thereof exceeds 25 wt-%, the crushing strength does not improve so much, and rather the activity may be lowered. Hence, the contents outside the above range should be avoided.

Said active component Ni can be carried by impregnation, deposition, co-precipitation, kneading, ion-exchange etc., though the impregnating method may usually be selected. Ni is supported on the CaO—$Al_2O_3$ carrier by impregnation in an ordinary way, then dried at about 120° C. and further calcined at a temperature of 300 to 400° C. or higher to decompose nitrates. The resulting catalyst corresponds to the catalyst CaN shown in Comparative Example 4 below. This catalyst is mentioned, in claims 5 and 6 in the present application, as the catalyst before carbon is added to the active component. The catalyst thus treated is thermally treated at about 900° C. in air, thereby forming $NiAl_2O_4$ as a compound of the active component and the carrier component, and it is known that subsequent reduction at about 750° C. yields a catalyst having Ni as the active component in the presence of $NiAl_2O_4$.

This catalyst falls under the catalyst CaNNA shown in Comparative Example 3 below. This catalyst is mentioned, in claims 2 and 3 in the present application, as the catalyst before carbon is added to the active component.

If such catalysts with the carbon-free active component are used, their activity is lowered more or less as shown in e.g., Comparative Example 3.

Hereinafter, the improved steam-reforming catalyst for hydrocarbons with a low reduction in catalyst activity in the present invention, is described using Ni.

The catalyst before carbon is added, which is exemplified by the catalysts NNA and CaNNA mentioned above, is treated with hydrogen and then subjected to the carbon treatment and oxidation/reduction treatment illustrated below, thereby giving the catalyst wherein the grating constants of Ni and $NiAl_2O_4$ after the treatment are compared with those of the catalysts before carbon is added, the increase of grating constant of Ni is 0.0001 nm to 0.0008 nm and the increase of the grating constant of $NiAl_2O_4$ is 0.001 nm to 0.005 nm.

Further, the catalyst before carbon is added, which is exemplified by the catalysts N and CaN mentioned above, is treated with hydrogen and then subjected to the carbon treatment and oxidation/reduction treatment illustrated below, thereby giving the catalyst wherein the grating constant of Ni after each treatment is compared with that of the catalyst before carbon is added, the increase of the grating constant of Ni is 0.0001 nm to 0.0008 nm.

Said carbon treatment can be conducted satisfactorily under such controlled conditions that the surface of the active component is not covered with carbon due to excessive precipitation of carbon. In one non-limiting example of said conditions, lower hydrocarbons containing about 1 to 4 carbon atoms are treated at 600 to 750° C. for 30 minutes to 5 hours in the presence of steam where the molar ratio of steam to the carbon in hydrocarbons ranges from 1 to 3. If unsaturated hydrocarbons are used as lower hydrocarbons, said molar ratio may be 2 to 4.

The catalyst thus treated with carbon is subjected to the oxidation/reduction treatment repeatedly one or more times whereby micronization of the carbon-containing active component, which is present along with the compound containing carbon in the active component and in the carrier, can be realized.

Hereinafter, the grating constant is described.

First, the catalyst in the present application is described. The increase of the grating constant of Ni in the catalyst of the present invention described above, as compared with that of the catalyst before carbon is added, exemplified by the above-mentioned catalysts NNA and CaNNA, is 0.0001 nm to 0.0008 nm, and the increase of the grating constant of $NiAl_2O_4$ in said catalyst is particularly preferably 0.001 nm to 0.005 nm.

If said increase with respect to Ni is less than 0.0001 nm, the effect may be low. Further, if said increase exceeds 0.0008 nm, the effect tends to be high, but even if it is more than 0.0008 nm, the effect is not significant relative to said increase, and thus said increase can be selected in the range of 0.0001 nm to 0.0008 nm.

If said increase with respect to $NiAl_2O_4$ is less than 0.001 nm, the effect may be low. Further, if said increase exceeds 0.005 nm, the effect tends to be high, but even if it is more than 0.005 nm, the effect is not significant relative to said increase, and thus said increase can be selected in the range 7>of 0.001 nm to 0.005 nm. One example is shown in Example 1, Comparative Example 1, Example 3 and Comparative Example 3 described below.

The increase of the grating constant of Ni in the catalyst after being subjected to said carbon treatment, as compared with that of the catalyst before carbon is added, exemplified by the above catalyst N, is particularly preferably 0.0001nm to 0.0008 nm.

If said increase is less than 0.0001 nm, the effect may be low. Further, if said increase exceeds 0.0008 nm, the effect tends to be high, but even if it is more than 0.0008 nm, the effect is not significant relative to said increase, and thus said increase can be selected in the range of 0.0001 nm to 0.0008 nm. One example is shown in Example 2 and Comparative Example 2 described below.

Here, the grating constant can be determined by e.g. the conventional X-ray diffraction method described in "Shin-Jikken Kagaku Kouza 6" (New Course in Experimental Chemistry 6), Basic Techniques 5, Structural Analysis, p. 110, compiled by the Chemical Society of Japan, Maruzen, 1977.

The relation between the increase of said grating constant and the carbon content is described. Generally, when an atom is dissolved in a pure substance, the grating constant is changed if the volume of the atom is different, and this is known as Vegard's law. The grating constant is also increased when the concentration of carbon in said active component is increased. From this point of view, the carbon content was measured, and it was found that when the increase of the grating constant of Ni was 0.0001 nm or more, the increase of the concentration of carbon in Ni was 0.2 atom-% or more. However, the detailed relation between the increase of the grating constant of $NiAl_2O_4$ and the increase of the carbon content is not completely revealed.

The concentration of carbon in the active component is measured in the temperature-programming reaction (TPR) described in a literature such as "Shokubai Kouza" (Course in Catalyst), vol. 3, p. 145, compiled by the Society of Catalyst, Kodansha, 1985.

Although the relationship between the increase of said grating constant and the increase of the carbon content is not completely revealed, if the conditions for increasing said grating constant are satisfied, a catalyst with no or little reduction in activity, even under steam-reforming conditions, referred to in the present invention, can be obtained. The conditions etc. for satisfying said grating constant can be determined satisfactorily by performing preliminary tests.

The improved steam-reforming catalyst for hydrocarbons has the following effects:

(1) Because of improvements in the reduction of the activity of the catalyst, the initial activity is maintained even after long-term operation, so it is not necessary to raise the stoving temperature which is conducted conventionally when the activity is lowered, and significant energy savings can thus be achieved.

(2) Because the initial activity is maintained for a prolonged period of time, the frequency of catalyst exchange is decreased, and the labor required for catalyst exchange can be reduced.

EXAMPLES

Although the present invention has been described as above, it will be described herein below by reference to Examples. It is a matter of course that the present invention is not limited to the following Examples only.

Example 1

Ni was carried in an amount of 6.8 wt-% by $\alpha$-$Al_2O_3$ with a diameter of 5 mm by the conventional impregnation method and then subjected to thermal treatment at 950° C. in air for 3 hours whereby 40 wt-%, based on Ni, of the contained Ni was converted into $NiAl_2O_4$. It was treated with hydrogen at normal pressure at 750° C. for 3 hours and then subjected to "carbon treatment" at normal pressure at 600° C. for 5 hours where the molar ratio of steam/methane (hereinafter referred to as S/C) was 1. Thereafter, it was placed in a steam stream at normal pressure and 650° C. for 15 minutes for "oxidation/reduction treatment" and immediately subjected to hydrogen treatment at normal pressure and 600° C. for 3 minutes. The carbon treatment and oxidation/reduction treatment described above were repeated again. The catalyst prepared in these treatments is called catalyst NNACRe.

The catalyst NNACRe was used continuously for methane steam-reforming reaction under the conditions of 10 bar, 600 C., S/C=3, and a space velocity of $SV_0$=200000 (1/h). The activity expressed in terms of degree of methane conversion indicated that the degree of methane conversion was 10.26% which was stable for 180 hours and did not change.

The grating constants of Ni and $NiAl_2O_4$ in the catalyst NNACRe were as follows.

|  | Ni | Ni $Al_2O_4$ (unit: nm) |
| --- | --- | --- |
| Before carbon treatment | 0.3523 | 0.7930 |
| After carbon treatment | 0.3525 | 0.7950 |
| After use | 0.3525 | 0.7950 |
| Increase of grating constant | 0.0002 | 0.002 |

Example 2

According to the conventional impregnation method, Ni was carried in an amount of 6.8 wt-% by $\alpha$-$Al_2O_3$ with a diameter of 5 mm, and the subsequent carbon treatment and oxidation/reduction treatment were conducted in the same manner as in Example 1. The resulting catalyst was called catalyst NCRe.

Using this catalyst, the continuous operation under the same conditions as in Example 1 was conducted. The degree of methane conversion was reduced by 0.57% from 11.21% for 180 hours.

The grating constant of Ni in the catalyst NCRe was as follows.

|  | Ni (unit: nm) |
| --- | --- |
| Before carbon treatment | 0.3523 |
| After carbon treatment | 0.3525 |
| After use | 0.3525 |
| Increase of grating constant | 0.0002 |

Comparative Example 1

A catalyst was prepared in the same manner as in Example 1 except that the carbon treatment and oxidation/reduction treatment in Example 1 were not conducted. This catalyst was called catalyst NNA.

Using this catalyst, continuous operation under the same conditions as in Example 1 was conducted. The degree of methane conversion was reducedby 0.41 from 9.18% for 180 hours.

The grating constants of Ni and $NiAl_2O_4$ in the catalyst NNA were as follows.

|  | Ni | $NiAl_2O_4$ (unit: nm) |
| --- | --- | --- |
| Before use | 0.3523 | 0.7930 |
| After use | 0.3523 | 0.7932 |
| Increase of grating constant | 0.0 | 0.0002 |

Comparative Example 2

A catalyst was prepared in the same manner as in Example 1 except that the carbon treatment and oxidation/reduction treatment in Example 2 were not conducted. This catalyst was called catalyst N.

Using this catalyst, the continuous operation under the same conditions as in Example 1 was conducted. The degree of methane conversion was reduced by 1.49% from 9.57% for 180 hours.

The grating constant of Ni in the catalyst N was is as follows.

|  | Ni (unit: nm) |
| --- | --- |
| Before use | 0.3523 |
| After use | 0.3523 |
| Increase of grating constant | 0.0 |

Example 3

A catalyst was prepared in the same manner as in Example 1 except that $CaO—Al_2O_3$ was used in place of $\alpha\text{-}Al_2O_3$ in Example 1. The resulting catalyst was called catalyst CaN-NACRe.

Using this catalyst, continuous operation under the same conditions as in Example 1 was conducted. The degree of methane conversionwas reducedby 0.21% from 6.73% for 90 hours.

The grating constants of Ni and $NiAl_2O_4$ in catalyst CaNNACRe were as follows.

|  | Ni | $NiAl_2O_4$ (unit: nm) |
| --- | --- | --- |
| Before carbon treatment | 0.3523 | 0.7960 |
| After carbon treatment | 0.3525 | 0.7990 |
| After use | 0.3525 | 0.7990 |
| Increase of grating constant | 0.0002 | 0.0030 |

Comparative Example 3

A catalyst was prepared in the same manner as in Example 3 except that the carbon treatment and oxidation/reduction treatment in Example 3 were not conducted. This catalyst was called catalyst CaNNA.

Using this catalyst, continuous operation under the same conditions as in Example 3 was conducted. The degree of methane conversion was reduced by 0.45% from 7.53% for 90 hours.

The grating constants of Ni and $NiAl_2O_4$ in catalyst CaNNA were as follows.

|  | Ni | $NiAl_2O_4$ (unit: nm) |
| --- | --- | --- |
| Before use | 0.3523 | 0.7960 |
| After use | 0.3523 | 0.7960 |
| Increase of grating constant | 0.0 | 0.0 |

Example 4

A catalyst was prepared in the same manner as in Example 2 except that $CaO—Al_2O_3$ was used in place of $\alpha\text{-}Al_2O_3$ in Example 2. This catalyst was called catalyst CaNCRe.

Using this catalyst, continuous operation under the same conditions as in Example 1 was conducted. The degree of methane conversion was reduced by 0.18% from 8.56% for 90 hours.

The grating constant of Ni in catalyst CaNCRe was as follows.

|  | Ni (unit: nm) |
| --- | --- |
| Before carbon treatment | 0.3523 |
| After carbon treatment | 0.3525 |
| After use | 0.3525 |
| Increase of grating constant | 0.0002 |

Comparative Example 4

A catalyst was prepared in the same manner as in Example 4 except that the carbon treatment and oxidation/reduction treatment in Example 4 were not conducted. This catalyst was called catalyst CaN.

Using this catalyst, the continuous operation under the same conditions as in Example 4 was conducted. The degree of methane conversion was reduced by 0.76% from 7.83% for 90 hours.

The grating constant of Ni in catalyst CaN was as follows.

|  | Ni (unit: nm) |
| --- | --- |
| Before carbon treatment | 0.3523 |
| After use | 0.3523 |
| Increase of grating constant | 0.0 |

The catalyst NNACRe (Example 1) illustrated as an example of the catalyst of the present invention did not show any reduction in activity for 180 hours. On the other hand, catalyst NNA (Comparative Example 1) illustrated example of a catalyst not falling under the present invention indicated a 0.41% reduction of the degree of methane conversion for 180 hours. From this result, the catalyst of the present invention showed a significant improvement in reduction of activity. Further, catalyst NCRe (Example 2) illustrated as an example of the catalyst of the present invention indicated only a 0.57% reduction of the degree of methane conversion for 180 hours. On the other hand, catalyst N (Comparative Example 2) exemplified as an example of a catalyst not falling under the present invention indicated an 1.49% reduction of the degree of methane conversion for 180 hours.

Further, catalyst CaNNACRe (Example 3) illustrated as an example of a catalyst of the present invention indicated only a 0.21% reduction of the activity for 90 hours. On the other hand, catalyst CaNNA (Comparative Example 3) illustrated as an example of a catalyst not falling under the present invention indicated a 0.45% reduction of the degree of methane conversion for 90 hours. Further, catalyst CaNCRe (Example 4) illustrated as an example of the catalyst of the present invention indicated only a 0.18% reduction of the degree of methane conversion for 90 hours. On the other hand, catalyst CaN (Comparative Example 4) illustrated as an example of a catalyst not falling under the present invention indicated a 0.76% reduction of the degree of methane conversion for 90 hours.

As described above, it was found that the catalyst of the present invention is a catalyst with significant improvements in reduction of activity.

What is claimed is:

1. In a steam-reforming catalyst for hydrocarbons wherein Ni, as an active component, is supported on an $\alpha$-$Al_2O_3$ carrier and part of the Ni combined with the carrier to form a $NiAl_2O_4$ compound, the improvement comprising carbon being provided in both the Ni active component and the $NiAl2O_4$ compound by a carbon treatment conducted at 600 to 750° C. for 30 minutes to 5 hours in the presence of steam and $C_{1-4}$ lower hydrocarbons, at a molar ratio of steam to carbon in the $C_{1-4}$ lower hydrocarbons ranging from 1 to 3, and at least one subsequent oxidation/reduction treatment, wherein the grating constants of the Ni and $NiAl_2O_4$ in the catalyst are increased by 0.0001 to 0.0008 nm and 0.001 to 0.005 nm, respectively, as compared to the grating constants of the Ni and $NiAl_2O_4$ in the catalyst prior to the provision of carbon therein.

2. The steam-reforming catalyst of claim 1, wherein Ni, as the active component, is present in an amount of from 3 to 20 wt.%, based on the weight of the catalyst.

3. The steam-reforming catalyst of claim 1, wherein carbon is present in the Ni in an increased amount of at least 0.2 atom % after the treatment steps are completed.

4. In a steam-reforming catalyst for hydrocarbons wherein Ni, as an active component, is supported on a CaO—$Al_2O_3$ carrier and a part of the Ni combined with the carrier to form a $NiAl_2O_4$ compound, the improvement comprising carbon being provided in both the Ni active component and the $NiAl_2O_4$ compound by a carbon treatment conducted at 600 to 750° C. for 30 minutes to 5 hours in the molar ratio of steam to carbon in the $C_{1-4}$ lower hydrocarbons ranging from 1 to 3, and at least one subsequent oxidation/reduction treatment, wherein the grating constants of the Ni and $NiAl_2O_4$ in the catalyst are increased by 0.0001 to 0.0008 nm and 0.001 to 0.005 nm, respectively, as compared to the grating constants of the Ni and $NiAl_2O_4$ in the catalyst prior to the provision of carbon therein.

5. The steam-reforming catalyst of claim 4, wherein Ni, as the active component, is present in an amount of from 3 to 20 wt.%, based on the weight of the catalyst.

6. The steam-reforming catalyst of claim 4, wherein carbon is present in the Ni in an increased amount of at least 0.2 atom % after the treatment steps are completed.

7. In a steam-reforming catalyst for hydrocarbons wherein Ni, as an active component, is supported on an $\alpha$-$Al_2O_3$ carrier, the improvement comprising carbon being provided in the Ni active component by a carbon treatment conducted at 600 to 750° C. for 30 minutes to 5 hours in the presence of steam and $C_{1-4}$ lower hydrocarbons, at a molar ratio of steam to carbon in the $C_{1-4}$ lower hydrocarbons ranging from 1 to 3, and at least one subsequent oxidation/reduction treatment, wherein the grating constant of the Ni in the catalyst is increased by 0.0001 to 0.0008 nm as compared to the grating constant of the Ni in the catalyst prior to the provision of carbon therein.

8. The steam-reforming catalyst of claim 7, wherein Ni, as the active component, is present in an amount of from 3 to 20 wt.%, based on the weight of the catalyst.

9. The steam-reforming catalyst of claim 7, wherein carbon is present in the Ni in an increased amount of at least 0.2 atom % after the treatment steps are completed.

10. In a steam-reforming catalyst for hydrocarbons wherein Ni, as an active component, is supported on a CaO—$Al_2O_3$ carrier, the improvement comprising carbon being provided in the Ni active component by a carbon treatment conducted at 600 to 750° C. for 30 minutes to 5 hours in the presence of steam and $C_{1-4}$ lower hydrocarbons, at a molar ratio of steam to carbon in the $C_{1-4}$ lower hydrocarbons ranging from 1 to 3, and at least one subsequent oxidation/reduction treatment, wherein the grating constant of the Ni in the catalyst is increased by 0.0001 to 0.0008 nm as compared to the grating constant of the Ni in the catalyst prior to the provision of carbon therein.

11. The steam-reforming catalyst of claim 10, wherein Ni, as the active component, is present in an amount of from 3 to 20 wt.%, based on the weight of the catalyst.

12. The steam-reforming catalyst of claim 10, wherein carbon is present in the Ni in an increased amount of at least 0.2 atom % after the treatment steps are completed.

* * * * *